Dec. 4, 1962  A. E. JANNARELLI ETAL  3,067,059
GLASS FIBER SCREENING AND METHOD
Filed Sept. 16, 1957
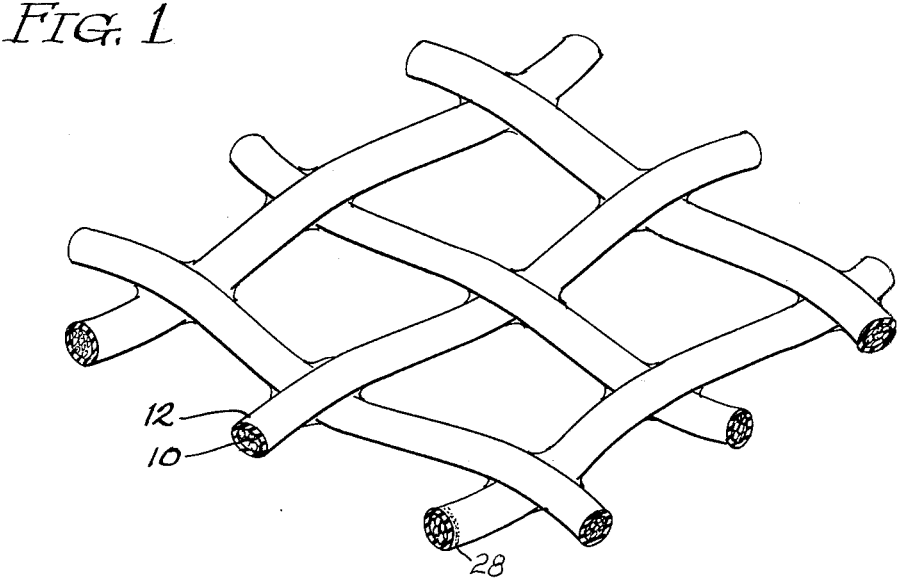
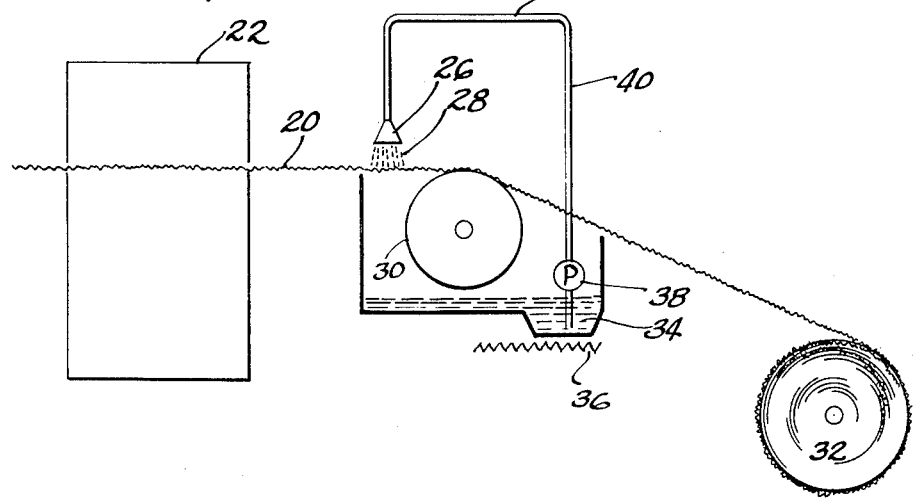
Albert E. Jannarelli
Frank L. Howard
  INVENTORS:
BY
Staelin & Overman
  Att'ys

3,067,059
GLASS FIBER SCREENING AND METHOD
Albert E. Jannarelli, Lonsdale, and Frank L. Howard, Kingston, R.I., assignors to Owens-Corning Fiberglas Corporation, Toledo, Ohio, a corporation of Delaware
Filed Sept. 16, 1957, Ser. No. 683,994
14 Claims. (Cl. 117—76)

This invention relates to an application of glass fibers and it relates more particularly to a solution of one of the problems confronting the widespread use of glass fibers as a screening material.

To the present, extensive use has been made of wires formed of metals in the manufacture of screening and the like. Such screens woven of ferrous materials, galvanized or ungalvanized, have been subject to attack by the elements existing in the atmosphere as represented by moisture, oxygen and the like whereby rusting occurs or other deterioration which necessitates occasional replacement of the screening material in the screen frame. Less widespread has been the use of screening woven of other metallic wires such as copper and aluminum. In addition to the increased cost of the copper or aluminum wires, screens woven of such materials remain subject to corrosion and deterioration with the result that replacement, though less frequent as compared to ferrous screening, is still required.

It has been found that an exceptionally inert screening material can be fabricated of strands or yarns of glass fibers wherein the strands or yarns are covered with a protective coating of a tough, synthetic, organic, film-forming resinous material as represented by polyvinyl chloride, polyvinylidene chloride, vinyl chloride-vinyl acetate copolymer, polyvinyl acetate, polyesters, polyamides, chlorinated rubber, rubber hydrochloride, synthetic rubbers, and the like. Such coating materials are characterized by flexibility and toughness in the dried state which protects the glass fibers against deterioration by abrasion. Strands or yarns of glass fibers thus confined within a sheath of the resinous film-forming polymer can be woven by conventional screening forming machines to produce screens having exceptional properties.

Because of the relative inertness of the glass fibers, the screening is unaffected by elements normally existing in the atmosphere as represented by oxygen, moisture, fumes, chemical vapors, fungus, mold or the like. Because of the exceptionally high strengths of the glass fibers, especially in the longitudinal direction, screening combining the properties of high strength and flexibility can be produced at less weight than metal screening of comparable strength. Thus by the use of glass fibers, a screening can be produced which is characterized by greater strength, greater flexibility, longer life, greater dimensional stability and lower weight per screen area.

One difficulty has been experienced in some isolated instances in the use of screening formed of glass fibers. This difficulty has presented a very interesting problem which has been made the subject of research over the past several months. Its elimination as applied to glass fibers appears to have application to the use of other fibers and materials of which screening is fabricated, including other siliceous fibers and the like. In brief, it has been found that some insects, especially the chewing insects, are capable of causing breakdown of the fibers to the extent that a break-through can be formed in the screen in a relatively short period of time. Representative of the insects with which this difficulty has developed are the chewing insects such as the cricket and the description of the concepts of this invention will hereinafter be made with reference thereto although it will be understood that the concepts are applicable as well to other insect attack. The cricket's attack on screening is attributable chiefly to its natural instinctive habit of chewing and less on factors such as confinement or hunger. It is believed that as a result of the chewing by the insect, degradation of the glass fibers occurs by the processes of mutual abrasion.

It will be understood that break-down by crickets and the like insects occurs only in isolated cases and in only relatively few areas to the extent that the problem is not prevalent wherever glass fiber screens are employed. Nevertheless this problem does represent a criticism in a few instances where such break-through occurs and the solution to the problem has presented a challenge to the industry.

Thus it is an object of this invention to produce and to provide a method for producing fibrous screening which is not subject to attack by insects and the like and it is a related object to produce an insect repellent, glass fiber screening.

More specifically, it is an object of this invention to produce a glass fiber screening which is insect repellent over a substantial period of use; which can be exposed to the atmosphere and wetted as by rain without noticeable deterioration of the insect repellent properties; which can be processed in a simple and efficient manner by the treatment of the fibers before or preferably after being woven into a screen, and it is a related object to provide a method for use in the manufacture of insect repellent glass fiber screening.

These and other objects and advantages of this invention will hereinafter appear and for purposes of illustration, but not of limitation, an embodiment of the invention is shown in the accompanying drawing in which—

FIG 1 is a perspectvie view of a fragmentary portion of a screening produced in accordance with the practice of this invention, and FIG. 2 is a diagrammatic flow sheet of the process for the manufacture of the screening shown in FIG. 1.

In the fabrication of glass fibers for weaving into screening and the like, strands 10 formed of continuous glass fibers (textile fibers) or yarns formed of continuous or discontinuous glass fibers (staple fibers) are advanced through a bath formed of a film-forming resinous polymer in solvent or aqueous dispersion, and preferably in the form of a plastisol or organosol wherein the film-forming resin polymer is present in a high concentration by weight. Excess amounts of the coating composition are removed from the coated strands of the glass fibers as by means of a scraper, or by means of a wiper pad, or by means of a die through which the coated yarns or strands are advanced to leave a controlled amount of the composition as a coating about the strands or yarns of the glass fibers. Upon removal of the diluent, as the coated yarns or strands are advanced through a drying oven, a tough sheath 12 of the film-forming resinous material is formed about the fibers tightly to encase the fibers into a unitary structure characterized by high strength in the longitudinal direction, high flexibility and exceptional resistance to attack by the elements to which the fibers might normally be exposed. The coated fibers can be formed to any desirable color by the incorporation of a pigment or dyestuff into the coating composition. These strands of glass fibers encased within a protective coating of a film-forming resinous material find excellent use as a replacement for metal wires used in the manufacture of screening with the few exceptions where the screens are subject to attack by insects, especially the kind which have the instinctive habit of chewing.

In the attempt to overcome the problem occasioned by the few instances where the fibers are subject to deterioration by crickets and the like, a large number of insect repellents have been applied to the screening formed of glass fibers. Of the hundreds of materials tried, only a relatively few appear to provide the desired insect repellency in the combination which makes use of coated glass fibers. Of these few, a large majority appear to embody a common characteristic in construction which not only provides the desired characteristics of insect repellency in the combination of glass fibers and a film-forming coating composition but which appears also to enter desirably in the combination to enhance the characteristics of the coated glass fibers and to become a more permanent part of the coated fibers in a manner to resist removal by water or other elements to which the screen might normally be exposed in use.

The materials which are capable of imparting relatively permanent insect repellency to the coated glass fibers, by comparison with a great number of other commonly known repellents, comprise a group of materials which may be identified as the fatty acids having a free carboxylic group attached to a long chain fatty acid group having more than two and preferably more than eight carbon atoms. The fatty acid group can be saturated or unsaturated. It can be modified or unmodified as by including a side chain group or other groups as represented by hydroxy, amino, halogeno, nitro, cyano, and the like groups. Representative of the more desirable fatty acid materials which may be used in the practice of this invention are caprylic acid, pelargonic acid, undecylenic acid, iodoacetic acid, capric acid, caproic acid, cyanoacetic acid, heptanoic acid, and the like fatty acids.

These materials are effective when embodied in the combination with the coated glass fibers in an amount greater than 1 percent by weight of the coated fibers but it is preferred to make use of an amount greater than 3 percent but less than 10 percent by weight. Repellency is secured when the fatty acid component is present in an amount greater than 10 percent by weight but it is undesirable from the standpoint of effect on the properties of the screening and from the standpoint of cost to make use of an amount wherein the fatty acid repellent constitutes more than 20 percent by weight of the screening.

The following will illustrate the relationship between concentration and repellency when caprylic acid (Neofat-8) is employed as the repellent. The repellent is applied as a finish to the coated glass fibers in amounts varying from 2 to 10 percent by weight to screening weighing 100 pounds per 2500 square feet of screening area. The values set forth in the following tables correspond to the average time for adult male crickets (*Acheta domestica*) to break through the treated screening, with the crickets on one side and food in the form of wet mash on the other.

TABLE 1

| Amount of Neofat-8 in percent by weight of the screening | Average Hours Repelled |
| --- | --- |
| 0 | Less than 17 |
| 2 | 72 |
| 4 | 84 |
| 6 | 84 |
| 8 | 96 |
| 10 | 108 |

The insect repellent of the type described can be applied as a component of the coated composition applied to the glass fibers in the manufacture of the coated strands. It has been found, however, that an improvement in kind is secured in effectiveness when the insect repellent is applied as a finish onto the previously coated strands of glass fibers. Application as a finish can be made to the coated glass fiber strands prior to weaving the strands to form the screening, but it is preferred to apply the repellent onto the screening material after it is formed.

The following will illustrate the improvements which are secured when the insect repellent is applied as a finish as compared to the same materials embodied in equivalent amounts as a component in the plastisol of polyvinyl chloride resin applied to the strands of glass fibers. In the development of the data, use was made of undecylenic acid in concentrations of 5 and 20 percent by weight of the coated glass fibers applied as a component of the plastisol and as a finish applied to the previously coated fibers. The hours repellency corresponds to the average time required for 5 adult male crickets (*Acheta domestica*) to break through screening treated in the manner described, with crickets on one side of the screen and food in the form of wet mash on the other.

TABLE 2

*Average Hours Repellency*

| | Plastisol | Finish |
| --- | --- | --- |
| 5% undecylenic acid | 17 | 53 |
| 20% undecylenic acid | 29 | 71 |

It will be apparent from the foregoing that the amount of repellency is increased almost three-fold when the repellent is applied as a finish onto the screening as compared to the same repellent in the same concentration embodied as a component in the coating composition applied to the glass fibers. Without repellent either in the coating or as a finish on the coated glass fibers, break through occurs in less than 17 hours and often in as little time as 3 hours.

It has been found further that the ability of the material to effect repellency depends somewhat on the manner in which the repellent is applied to the coated glass fiber screening. Application can be made onto the coated fibers, followed by heat treatment. Best results, however, are secured when the repellent is applied while at an elevated temperature and preferably while the coated glass fibers are also pre-heated to an elevated temperature. The repellent can be heated to a temperature below vaporization or breakdown temperature of the compound, but preferably above room temperature. With the fatty acid materials described, a temperature within the range of 150–300° F. will give excellent results. The coated glass fibers or screening can be heated to a higher temperature, such for example, as a temperature above room temperature and preferably above 250° F. but below the decomposition temperature for the synthetic film-forming resinous material which is employed as a coating onto the glass fibers.

It is desirable to heat the coated glass fibers to a temperature sufficient to soften the resinous material in order to prepare the surface more ably to receive the repellent in a desired bonding relationship, thereby to hold the repellent onto the coated glass fibers sufficiently strongly to resist removal by water, rain, or the like. The difference between preheating, i.e., heating the coated glass fiber screening to an elevated temperature (400° F.) prior to the application of the repellent (caprylic acid) and after heating, i.e., heating the coated glass fiber screening to an elevated temperature (400° F.) after application of the repellent (caprylic acid) is illustrated by the following results. The data presented is for the amount of feeding which takes place using male crickets when the screening is finished to provide caprylic acid in an amount corresponding to about 14 percent by weight of the screening. Light-to-heavy feeding was observed with the after heated screen as compared to no feeding with the preheated screen.

The improvements secured by the application of materials while the materials are hot as compared to cold, can be illustrated by the data secured with Neofat-8 added in amounts of 20 percent by weight as a finish to the screening and subsequently tested for repellency after washes with water for various lengths of time.

TABLE 3

| Wash Time | Average Hours Repellency | |
| --- | --- | --- |
| | Hot Application | Cold Application |
| 5 minutes | 89 | 17 |
| 10 minutes | 89 | 41 |
| 30 minutes | 89 | 53 |
| 60 minutes | 89 | 53 |

It will be apparent from the foregoing that application while hot provides repellency which remains constant notwithstanding exposure to water for varying lengths of time, whereas the repellency is considerably less than when the same materials are applied in the cold state to the same screening. Thus, water was able to remove repellent when applied cold but not when applications were made in the heated state.

Referring now to the drawing, the numeral 20 represents screening of coated glass fibers which is supplied in endless lengths from suitable feed rolls for advancement continuously through a heating chamber 22 heated to a temperature sufficient to raise the temperature of the screening to about 400° F., plus or minus 100° F. From the heating chamber 22, the heated screening 20 is passed through an applicator housing 24 having a plurality of spray heads 26 extending crosswise of the housing above the screening 20 and from which repellent 28 is sprayed onto the top surface of the screening as it is advanced under the spray heads. From the spray heads, the screening wetted with repellent is advanced over a padding roll 30 which operates to distribute the repellent to the under side and into the areas between the coated strands of glass fibers substantially uniformly to distribute the repellent and to remove excesses from the surfaces of the coated fibers. From the applicator housing 24, the screening 20 with the repellent on the surface is rewound into rolls 32 by a conventional winder.

Excess repellent from the spray heads and from the padding roll is collected in a trough 34 in the bottom of the housing 24. Heating elements, represented by the numeral 36, are provided in the trough for raising the temperature of the repellent prior to recirculation by the pump 38 through the conduits 40. Makeup material can be fed constantly into the housing 24 in amounts corresponding to the material retained on the screen or else a batch process can be employed wherein measured amounts of repellent are introduced periodically into the housing. It will be understood that other conventional means may be employed for the application of repellent onto the surfaces of the screen or for heating the screening and repellent to desired elevated temperatures for application.

The repellent is applied in liquid form at elevated temperature without dilution, or it may be applied as an aqueous dispersion or solution in concentrations which may be selected to provide deposition in the desired amounts. When applied from an aqueous system, the maximum temperature to which the composition can be heated would be in the order of about 212° F., which is the boiling point for water.

A conventional antioxidant, as represented by hydroquinone, can be incorporated into the treating material in an amount ranging from 0.1 to 2.0 percent by weight to minimize oxidative deterioration of the repellent. By way of still further modification, an ultra violet absorber, such as described in the following patents, can also be added to the treating composition in an amount corresponding to 0.001 to 0.1 percent by weight to minimize the effect of sunlight on the finished screening:

| | |
| --- | --- |
| 2,038,114 | 2,205,870 |
| 2,062,179 | 2,209,419 |
| 2,122,828 | 2,370,244 |
| 2,128,334 | 2,614,940 |
| | 2,653,109 |

Similarly, materials to impart dirt repellency, static repellency, light stability, and improved weathering characteristics can be embodied in the treating composition or otherwise applied to glass fibers to improve the performance characteristics thereof.

An important concept of this invention resides in the treatment of the screening with a combination of materials which includes an insect repellent to discourage the cricket from cutting through the screening, and an insecticide which is absorbed by the cricket to cause the cricket to lose interest in damaging the screening or otherwise to destroy the insect. When use is made of the combination of repellent and insecticide in a finish applied to the coated glass fibers, it is desirable to make use of the repellent in an amount sufficient to discourage the cricket, at least until a sufficient dosage of insecticide is absorbed to cause the cricket to lose interest or to be killed.

It has been found that the chlorinated hydrocarbons which are representative of one form of insecticide which may be used, finds excellent use in combination with the fatty acid repellents since the chlorinated hydrocarbons are compatible with the fatty acids to form a stable system. Further, the combination of a chlorinated hydrocarbon insecticide and a fatty acid repellent provides for lubricity which improves the hand and feel of the screening while also bonding strongly to the surfaces thereof. Representative of the chlorinated hydrocarbon insecticides are 1,1,1 - trichloro - 2,2 - bis(p-chlorophenyl) ethane (DDT), benzene hexachloride, 1,2,3,4,10,10-hexachloro - 6,7 - epoxy - 1,4,4a,5,6,7,8,8a - octa - hydro-1,4,5,8 - dimethanonaphthalene (Dieldrin), 1,2,3,4,10,10-hexachloro - 14,4a,5,8,8a - hexahydro - 1,4,5,8 - dimethanonaphthalene (Aldrin), etc.

The desired results are secured when the repellent and insecticide are employed in the ratio of 1:7 to 1:40, as illustrated by the following data developed from the combination of insecticide, represented by Dieldrin, and repellent, represented by Neofat-8, provided in amounts to correspond to 10 percent by weight of the screening.

TABLE 4

| Ratio of Neofat-8 to Dieldrin | Average Hours Repellency |
| --- | --- |
| Dieldrin alone | 12 |
| 1:7 | 52 |
| 1:15 | 112 |
| 1:31 | 82 |

Satisfactory results can be secured when the repellent and insecticide are present in equal amounts by weight.

It will be apparent from the foregoing that the chlorinated hydrocarbon insecticide is ineffective when used alone. Without repellent, the amount of insecticide absorbed by the cricket before break-through is insufficient to have any effect. Thus, the success of the system depends upon the combination of repellent with the insecticide when an insecticide is employed. When use is made of the combination of fatty acid repellent and chlorinated hydrocarbon insecticide within the ratio described, less repellent is required on the coated glass fiber screening to achieve the desired results since it is only necessary to prevent the cricket from cutting through the screening for a time until the cricket absorbs a toxic dosage of insecticide. It will be understood that insecticides other than chlorinated hydrocarbon can be employed in the described combinations with repellent.

In addition to insect repellency, the fatty acids appear also to enhance the resistance to fungus growth on the screen. Thus, the treatment described provides for improved fungus repellency as well as insect repellency in many instances.

While obviously not equivalent, other materials can be used in the treatment of glass fiber screening to enhance repellency. These include copper-3-phenyl salicylate, copper diisopropyl salicylate, isothiocyamic acid phenyl ester, N-octyl alcohol, cyanoacetic acid, phenylmercuric acetate, phenyl isothiocyanate, and butadiene furfural copolymer.

It will be apparent from the foregoing that description is made in the modification of screening formed of glass fibers to provide means for overcoming the deterioration of the glass fibers occasioned by insect attack through means which discourages the interest of the cricket in attacking the screening. It will be apparent also that modifications in the treating composition and in its method of application may be employed to modify the characteristics developed to increase the effectiveness of the repellent by the destruction of the insect during attack, thereby to achieve the desired results both by repellent action and insecticidal action in many instances.

It will be understood that changes may be made in the details of formulation of materials and in their application to the glass fiber screening without departing from the spirit of the invention, especially as defined in the following claims.

We claim:
1. A screening material comprising the combination of interwoven strands of siliceous fibers, a first continuous coating on the strands of siliceous fibers formed of a synthetic film forming polymeric material, and a second coating present as a finish extending substantially throughout the length of the coated strands of siliceous fibers containing an insect repellent fatty acid in which a free carboxylic group is attached to a fatty acid group and in which the fatty acid group has more than 8 carbon atoms.

2. In the method of producing a screening formed of interwoven strands of siliceous fibers having a protective coating on the siliceous fiber surfaces formed of a synthetic film forming polymeric material, the improvement comprising heating the coated siliceous fibers to an elevated temperature above room temperature but below the decomposition temperature for the polymeric coating material, heating an insect repellent comprising a fatty acid in which a free carboxylic group is attached to a fatty acid group and in which the fatty acid group has more than 8 carbon atoms to a temperature above room temperature but below the decomposition temperature for the fatty acid material, and applying the hot fatty acid onto the heated coated siliceous fibers in an amount within the range of 1 to 20 percent by weight of the coated fibers.

3. A screening material comprising the combination of interwoven strands of glass fibers, a first continuous coating on the strands of glass fibers formed of a synthetic film-forming polymeric material, and a second coating present as a finish extending substantially throughout the length of the coated strands of glass fibers containing an insect repellent fatty acid in which a free carboxylic group is attached to the fatty acid group and in which the fatty acid group has more than 8 carbon atoms.

4. A screening material as claimed in claim 3 in which the fatty acid component is present in an amount within the range of 3 to 10 percent by weight of the coated glass fibers.

5. A screening material as claimed in claim 3 in which an antioxidant is present in combination with the fatty acid and is present in an amount within the range of 0.1 to 2.0 percent by weight.

6. A screening material as claimed in claim 3 in which an ultraviolet absorber is present in combination with the fatty acid and is present in an amount within the range of 0.001 to 0.1 percent by weight of the fatty acid.

7. A screening material comprising the combination of interwoven strands of glass fibers, a first coating on the strands of glass fibers formed of a synthetic film-forming polymeric material, and a second coating over the coated strands of glass fibers containing an insect repellent selected from the group consisting of caprylic acid, pelargonic acid, undecylenic acid, iodoacetic acid, capric acid, caproic acid, cyanoacetic acid and heptanoic acid.

8. A screening material comprising the combination of interwoven strands of glass fibers, a first coating on the strands of glass fibers formed of a synthetic film-forming polymeric material, a second coating over the coated strands of glass fibers containing an insect repellent and an insecticide in which the insect repellent is selected from the group consisting of caprylic acid, pelargonic acid, undecylenic acid, iodoacetic acid, capric acid, caproic acid, cyanoacetic acid and heptanoic acid, and in which the insecticide is compatible with the repellent and present in an amount within the ratio of 1 part by weight of repellent to 70–40 parts by weight of insecticide.

9. A screening material as claimed in claim 8 in which the insecticide is selected from the group consisting of 1,1,1 - trichloro - 2,2 - bis ethane, benzene hexachloride, 1,2,3,4,10,10 - hexachloro - 6,7 - epoxy - 1,4,4a,5,6,7,8, 8a - octahydro - 1,4,5,8 - dimethanonaphthalene, 1,2,3,4, 10,10 - hexachloro - 1,4,4a,5,8,8a - hexahydro - 1,4,5,8- dimethanonaphthalene.

10. In the method of producing screening formed of interwoven strands of glass fibers having a protective coating on the glass fiber surfaces formed of a synthetic film-forming polymeric material, the improvement comprising heating the coated glass fibers to an elevated temperature above room temperature but below the decomposition temperature for the polymeric coating material, heating an insect repellent comprising a fatty acid in which a free carboxylic group is attached to a fatty acid group and in which the fatty acid group has more than 8 carbon atoms to a temperature above room temperature but below the decomposition temperature for the fatty acid material, and applying the hot fatty acid onto the heated coated glass fibers in an amount within the range of 1–20 percent by weight of the coated fibers.

11. The method as claimed in claim 10 in which the coated glass fibers are preheated before application of the repellent to a temperature of about 400° F. ± 100° F.

12. The method as claimed in claim 10 in which the coated glass fibers are heated to a temperature of about 400° F. ± 100° F. and in which the repellent in the form of a fatty acid is heated to a temperature of 200° F. ± 50° F.

13. In the method of producing screening formed of interwoven strands of glass fibers having a protective coating on the glass fiber surfaces formed of a synthetic film-forming polymeric material, the improvement comprising heating the coated glass fibers to an elevated temperature above room temperature but below the decomposition temperature for the polymeric coating material, combining an insecticide and insect repellent in which the repellent is selected from the group consisting of caprylic acid, pelargonic acid, undecylenic acid, iodoacetic acid, capric acid, caproic acid, cyanoacetic acid and heptanoic acid, and in which the insecticide is selected from the group consisting of 1,1,1 - trichloro - 2,2- bis ethane, benzene hexachloride, 1,2,3,4,10,10-hexachloro - 6,7, - epoxy - 1,4,4a,5,6,7,8,8a - octahydro - 1,4,5, 8 - dimethanonaphthalene, 1,2,3,4,10,10 - hexachloro-1,4,4a,5,8,8a - hexahydro - 1,4,5,8 - dimethanonaphthalene, and in which the materials are present in the ratio of 1 part by weight of the repellent to 70–40 parts by weight of the insecticide, heating the mixture to an elevated temperature but below the temperature for the decomposition of either the insecticide or repellent, and applying the heated composition onto the heated coated glass fibers in an amount to provide coating weights of from 1–20 percent by weight of the glass fibers.

14. A screening material comprising elongate elements formed of a plurality of glass fibers linearly arranged as a core, a thin protective coating about the core formed of a synthetic film-forming polymeric material, and a finish on the coated glass fiber surfaces formed of a compound selected from the group consisting of copper-3-phenyl salicylate, copper diisopropyl salicylate, isothiocyamic acid phenyl ester, N-octyl alcohol, phenyl mercuric acetate, phenyl isothiocyanate, and butadiene furfural copolymer, and in which the finish is present on the coated glass fibers in an amount within the range of 1–20 percent by weight.

References Cited in the file of this patent

UNITED STATES PATENTS

| | | |
|---|---|---|
| 2,252,157 | Bergin et al. | Aug. 12, 1941 |
| 2,621,163 | Coash | Dec. 9, 1952 |
| 2,673,824 | Biefeld et al. | Mar. 30, 1954 |
| 2,763,566 | Van Allan | Sept. 18, 1956 |
| 2,769,222 | Southwell | Nov. 6, 1956 |
| 2,771,659 | Ball | Nov. 27, 1956 |
| 2,822,295 | Barrett et al. | Feb. 4, 1958 |

OTHER REFERENCES

Shepard: "The Chemistry and Action of Insecticides," McGraw-Hill, 1951, page 155.

King: "Chemicals Evaluated as Insecticides and Repellants at Orlando, Florida," pages 101, 102, 105, 157 and 251, May 1954.

Moncrieff: "Artificial Fibres," John Wiley & Sons, Inc., 1954, page 345.